United States Patent [19]

Lech

[11] Patent Number: 4,795,103

[45] Date of Patent: Jan. 3, 1989

[54] PULVERIZING APPARATUS

[76] Inventor: Stanley J. Lech, Box 56, Quakake, Pa. 18245

[21] Appl. No.: 52,278

[22] Filed: May 21, 1987

[51] Int. Cl.⁴ .............................................. B02C 23/14
[52] U.S. Cl. ...................................... 241/77; 241/99; 241/101.7; 241/186.2; 241/189 R; 241/DIG. 38
[58] Field of Search ...................... 241/76, 77, 79.1, 81, 241/101.7, 101.2, 186.2, 189 R, 194, 99, DIG. 38, 186.3

[56] References Cited

U.S. PATENT DOCUMENTS

| | | | |
|---|---|---|---|
| 1,397,828 | 11/1921 | Williams | 241/189 R |
| 1,422,761 | 7/1922 | Hartman | 241/186.3 |
| 2,293,664 | 8/1942 | Roberts | 241/81 X |
| 3,164,862 | 1/1965 | Zies | 241/101.2 X |
| 3,409,235 | 11/1968 | Quinn | 241/76 |
| 3,885,744 | 5/1975 | Drage | 241/DIG. 38 X |
| 4,139,454 | 2/1979 | Larson | 241/81 X |
| 4,341,353 | 7/1982 | Hamilton et al. | 241/DIG. 38 X |

Primary Examiner—Howard N. Goldberg
Assistant Examiner—Joseph M. Gorski
Attorney, Agent, or Firm—Eugene E. Renz, Jr.

[57] ABSTRACT

Apparatus for producing pulverized glass which is free from non-glass particles, in which a glass supply is transferred to an impactor to pulverize the glass and also is subjected to magnetic means to remove metal and vacuum means to remove dust, paper, plastic and the like. The pulverized glass is sorted as to size and passed once again past a magnet means prior to depositing the sized pulverized glass in a collection bin.

13 Claims, 4 Drawing Sheets

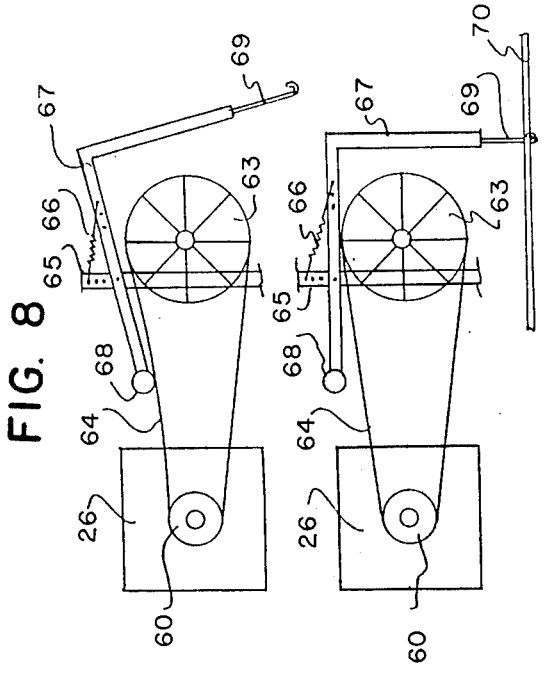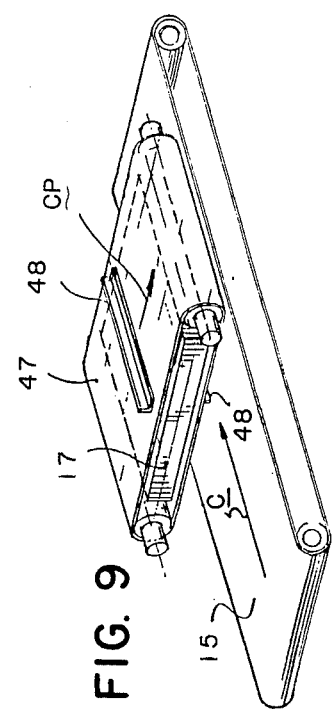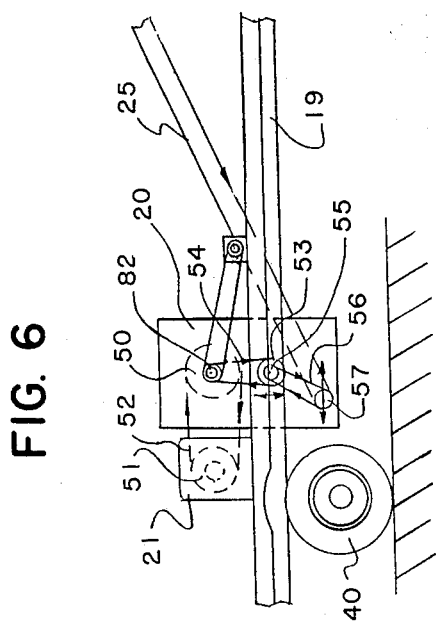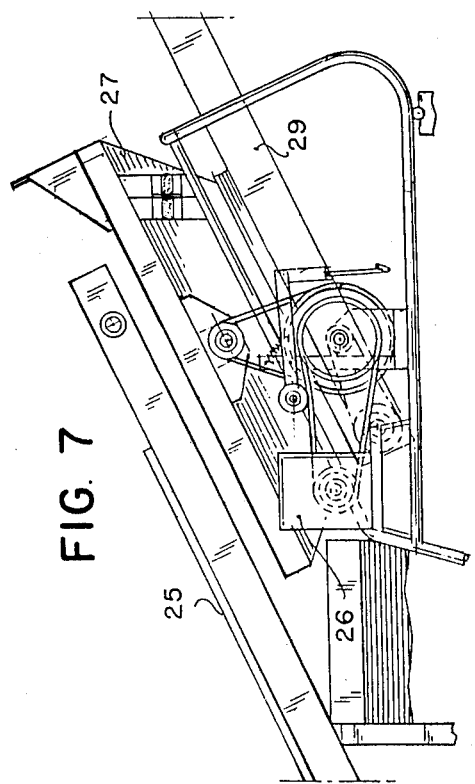

PULVERIZING APPARATUS

FIELD OF THE INVENTION

This invention relates to apparatus for pulverizing materials such as glass bottles, plated glass, laminated glass or similar materials. The invention particularly relates to a portable system which may be moved from location to location as appropriate and which is suited to produce a desired size of clean product which does not contain undesirable materials such as metal or plastic.

BACKGROUND OF THE INVENTION

After the initial public endorsement of recycling products such as glass and the like as part of environmental concerns, interest in saving small size glass products such as bottles and jars has declined because of the difficulty in transporting glass to recycling plants. One particular difficulty is that glass such as plate glass and laminated glass is dangerous to handle and is not easily transported in large quantities. In addition, the economics of transporting large quantities of empty glass bottles to a major central processing plant where large volumes of glass bottles would be processed do not favorably justify the expense.

Attempts to have remote recycling locations have not met with as much success as would be desirable for several reasons. First, the cost of loading and unloading glass bottles from recycling locations inovlves a duplication of effort as glass products must be stored at the location, removed and transported to a final processing plant and then removed again from the transporting vehicle. Also, storage containers at the remote sites either need to be emptied relatively often or they are too large and unsightly or they are uneconomical to construct.

A major problem in handling small glass containers and other glass products at any recycling plant is the difficulty incurred in producing a clean product. There has not yet been a suitable method for separating the metal caps and neckbands that are present on various types of beverage bottles which employ the tamper proof twist caps without incurring a significant amount of hand labor. This, of course, is excessively expensive. Conventional machines such as hammermills are unsuitable for treating glass bottles because they crush the metal parts and glass together. Often times, plastic products are used as caps and other components of glass products, such as labeling and the like, and separating the glass is equally difficult. Both plastic and metal are objectional contaminants for glass which can be used in recycling plants.

It is a general object of this invention to provide a device which is suitable for pulverizing glass without the aforementioned difficulties of contamination by metal and/or plastic and which is suitable for transportation to remote collection sites for use at the collection sites to eliminate or substantially reduce transportation expenses. It is envisioned that a device of the type described herein, which would be useful for transporting to various remote sites, could be employed in some regular schedule or system for visiting a plurality of remote collection sites to thereby produce a pulverized glass product which is clean enough to be used in recycling plants.

Another object of the present invention is to provide a glass pulverizing apparatus which may be transported to various locations and which is capable of separating metal and/or plastic parts from the glass as it is being pulverized, so as to produce distinct and separate collected quantities of scrap metal, paper and other light weight contaminants and relatively pure crushed glass.

SUMMARY OF THE INVENTION

In accordance with the present invention, it has now been discovered that a recycling apparatus for processing salvageable glass may be provided in the following manner. A feed means is provided for supplying a quantity of glass objects. Vibrating feeder chutes are effective in regulating flow so that a steady supply of glass is placed on the conveyor. The objects are deposited on a first conveyor means which is preferred to be portable by itself and is capable of being moved to the appropriate location. This first conveyor means is positioned to receive glass objects and transfer them to an impactor means. The first conveyor means also contains a first magnet means mounted thereon, such that a rotating cross-belt and magnet are positioned to remove metallic objects as the glass objects are transported on the first conveyor means.

Located on a larger vehicle such as a flatbed trailer is the remainder of the processing equipment. Initially receiving the glass products after they have passed the first magnet means is a first impactor means which is positioned to receive the products directly from the discharge end of the first conveyor means. These glass objects are then taken by the impactor means and impelled against a striker plate which shatters the glass. The shattered glass is further processed in the impactor means to produce a relatively high percentage of glass in a predetermined size. Positioned below the impactor means is a second conveyor means which is adapted to receive the shattered glass and transfer that glass to a sizing means. A vacuum system is placed adjacent to the second conveyor means at or near the point of where the shattered glass is deposited on the second conveyor means so as to remove dust and light weight products such as paper and plastic from the shattered glass.

The second conveyor means then deposits the shattered glass onto a vibrating screen which removes oversize particles while the majority of the shattered glass is passed through the vibrating screen onto the third conveyor as it is of a relatively uniform and desired size of particle. As the shattered glass passes along the third conveyor means, a second magnet means is positioned to pass in an operationally close relation to the shattered glass to remove any remaining pieces of metal which may have passed from the second conveyor means. Fragments of tops and tamper proof rings are picked up by this second magnet means since they have been separated from the bottle by this time. The finished product passes on the third conveyor means which then deposits this clean pure product into a container for transportation to a recycling plant.

BRIEF DESCRIPTION OF THE DRAWINGS

These and other objects of the present invention and the various features and details of the operation and construction thereof are hereinafter more fully set forth with reference to the accompanying drawings, wherein:

FIG. 6 is a fragmentary schematic view showing an additional embodiment of the present invention.

FIG. 7 is an enlarged fragmentary side elevational view showing a portion of the delivery conveyor, conveying crushed glass to the vibrator separator.

FIG. 8 is a partial view shown in schematic of two operating modes of the device shown in FIGS. 6 & 7.

FIG. 9 is a schematic view showing details of one particular embodiment of the present invention.

DETAILED DESCRIPTION OF THE PREFERRED EMBODIMENT

Figure 1:
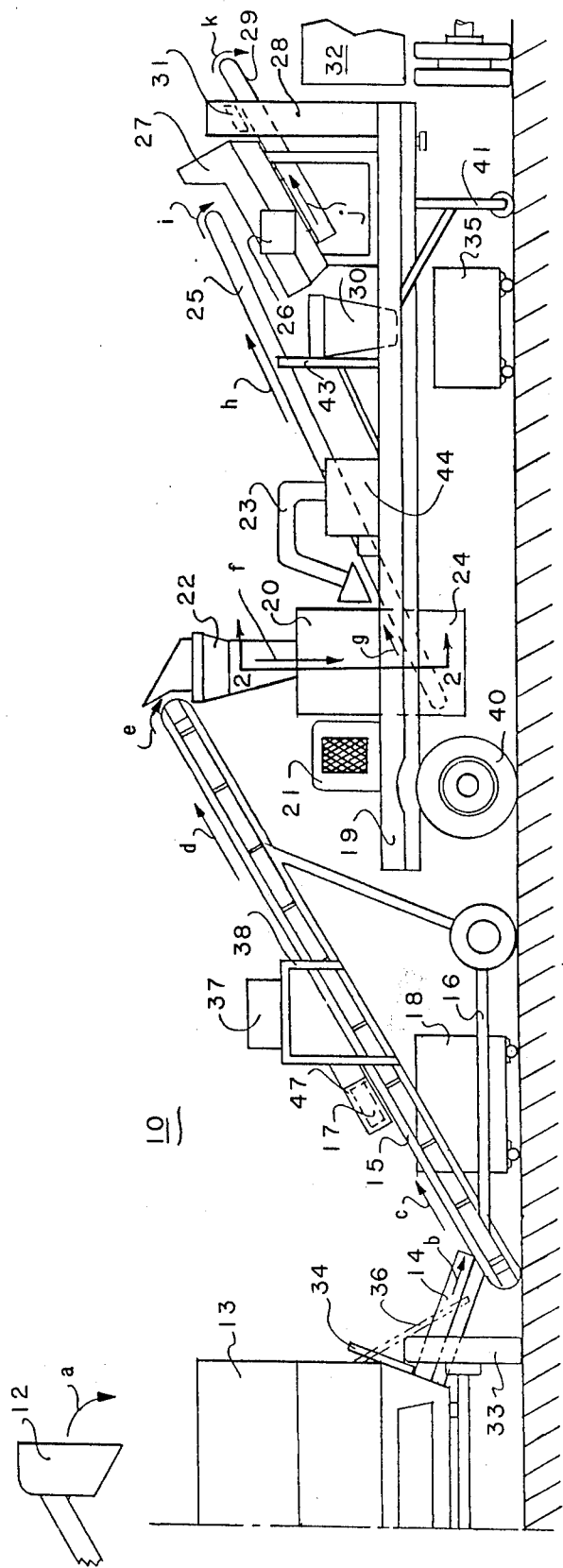
FIG. 1 is a semi-schematic side elevational view of a portable pulverizing apparatus according to the present invention, shown in combination with a supply means and a portable transporting unit for removing finished product.

Shown generally in FIG. 1 is a system 10 for processing salvageable glass such as bottles, plate glass, laminated glass and the like. The system is portable and can be moved from site to site as needed, thereby eliminating the need for providing a glass pulverizer apparatus at each site, in that the processor is only operated for limited periods of time.

As shown in FIG. 1, glass products are received from a source 12 in the direction of arrow a and are deposited into a hopper or portable gravity feed bin 13 which passes the glass products through a vibrating chute 14 which is sized to fit the available space and drop bottles in the direction of arrow b onto a first conveyor 15. The conveyor 15 is supported on an undercarriage 16 and transports the glass products in the direction of arrow c past a first magnetic means 17 which removes metallic objects and deposits them in a refuse bin 18. The glass products are then continued to be carried by the conveyor 15 in the direction of arrow d and deposited into the next system in the direction shown by arrow e.

As an additional embodiment, the use of a sorter system to separate the white or clear glass from brown or green may be considered. Conveyors between the vibrator feeder chute 14 and conveyor 15 can be arranged for the convenience of one or more persons acting as sorters. These optional conveyors, not shown in the drawing, can be wheeled into place when neeed.

Contained on a trailer flatbed 19 is a pulverizing mill 20 which is driven by motor 21 and which has an input hopper 22 to receive the glass products from the conveyor 15. These products drop through the pulverizing mill 20 in the direction shown by arrow f and are subjected to a pulverizing action as will be described hereinafter.

Pulverized glass products are then transported on conveyor 25 in the direction shown by arrow g. As the products leave the pulverizing mill 20, they are subjected to a vacuum 23 which collects dust and light weight particles such as paper, plastic and the like in a dust collection tank 24. The conveyor 25 then takes the cleaned glass particles in the direction shown by arrow h.

The cleaned products are then deposited on a vibrating screen 27 which is driven by motor 26, so as to separate the uniformly sized particles which fall from conveyor 25 in the direction shown by arrow i. Oversized products do not pass through the screen but fall into refuse chute 30 which deposits the unwanted oversized particles in refuse bin 35. It is contemplated that two different sized screens may be used in separating specific sizes of glass particles, and in fact, to produce final products of different sizes or degree of uniformity. Oversized products may be recycled back to bin 13 for repeat processing. A third conveyor 29 is supported by the forward section of the trailer 28 and transports the screened pulverized glass in the direction shown by arrow j past a second magnetic means 31 which removes any final metallic particles. These cleaned shattered and screened glass particles then leave conveyor 29 in the direction shown by arrow k into transporting bin 32.

The portable gravity feeder bin 13 has an adjustable door 34 which is controlled by an adjustable chain 36 to transfer glass through vibrating chute 14. An even, regular flow is maintained by the adjustable door and vibrating chute to optimize the operating efficiency of the device. The bin 13 may be continuously supplied with glass during operation, particularly if the on site supply is larger than the capacity of bin 13.

As previously described, the pulverizing mill 20 is mounted on the trailer bed 19. Depending upon the length of the trailer bed 19, the location of the mill 20 will be determined by the amount of available space. For example, instead of locating the mill 20 near the rear tire 40 as shown in FIG. 1 where the conveyor 15 provides glass products into hopper 22, a larger trailer bed 19 might permit the relative location of the mill 20 to be closer to the support wheel 41 end of the trailer bed 19 and most of the equipment contained on under carriage 16 could be mounted on the extended length of the trailer. In any event, both the first conveyor means 15 and the equipment associated with under carriage 16 and all of the equipment contained on trailer bed 19 are portable and can be moved from site to site.

The pulverizing mill 20 is more clearly understood in reference to FIGS. 2 through 5. The mill is adapted to pulverized glass products or the like to a desired particle size and additionally to separate the glass from adherence to any nonglass parts such as metal, which might be in the raw product supplied through chute 22.

Figure 2:
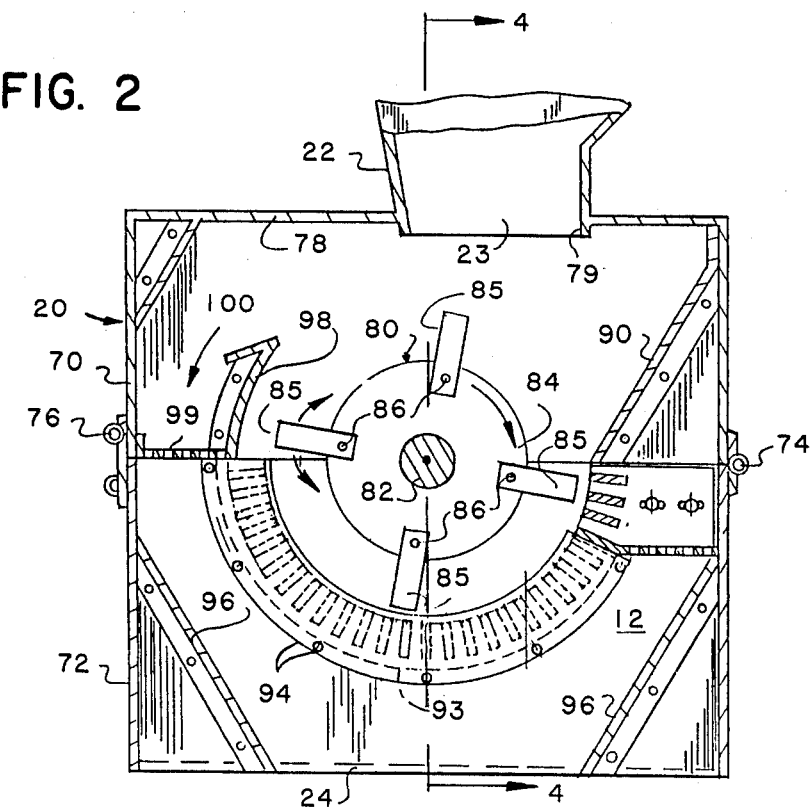
FIG. 2 is a section view of the pulverizing mill shown in FIG. 1 taken along the lines 2—2 of FIG. 1.

In FIGS. 2 through 5, a particularly preferred pulverizing mill device is shown. This mill 20 is constructed for the purpose of pulverizing materials such as glass bottles, glass plate, laminated glass and other glass materials to provide a desired particle size of cleaned product. As shown in FIG. 2, the mill 20 is arranged to treat glass bottles. In an alternative embodiment, in FIG. 3, the mill 20 is set for treatment of plate glass as will be described hereinafter.

As shown in FIG. 2, the pulverizing mill 20 comprises a box-shaped housing having an upper portion 70 and a lower portion 72. Upper portion 70 is hingedly mounted on lower portion 72 by a hinge 74 and is secured in position by a latch 76. Hopper 22 is mounted on the top wall 78 of upper housing 70 and is arranged to feed material into the interior of the housing through an opening 79 in top wall 78.

Figure 4:
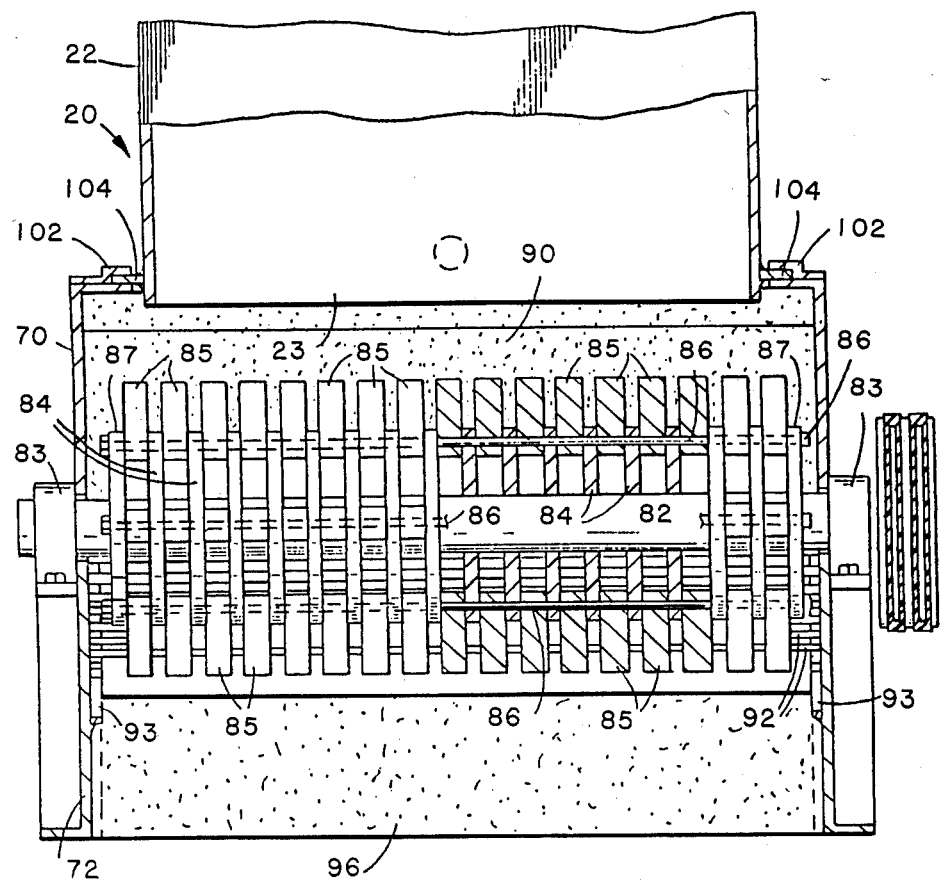
FIG. 4 is a section taken along lines 4—4 of FIG. 2.

A swing hammer head 80 is rotatably mounted to extend horizontally across the housing beneath hopper 22 and comprises a rotating shaft 82 supported on bearings 83, seen in FIG. 4, and a plurality of spacer plates 84 keyed onto shaft 82 along the length thereof for rotation therewith. Four sets of swing hammers 85 are pivotally mounted in circumferentially spaced relation on head 80 to rotate therewith. To this end, each set of swing hammers 85 is pivotally mounted on an elongated pin 86 extending axially through the alternately arranged swing hammers 85 and spacer plates 84 and secured at the end plates 87 as is best shown in FIG. 4. As the head 80 is caused to rotate in a clockwise direction as shown by the arrow in FIG. 2, swing hammers 85 are held by centrifugal force in a radially extending position relative to the axis of shaft 82. When swing hammers 85 come into contact with non-crushable material, they are free to swing back to allow the material to pass through the machine without crushing the same. This type of swing hammer head arrangement is well known and is utilized in conventional hammermills.

A striker plate 90 is mounted in upper housing portion 70 above the level of the axis of rotation of the swing hammer head 80 and is arranged to face in the direction opposite the direction of movement of hammers 85 in the upper housing portion 70 (ie., from left to right as viewed in FIG. 2). Accordingly, as hammers 85 strike material falling downwardly through hopper 22 into the interior of upper housing portion 70 the struck material is propelled toward striker plate 90 to impact therewith and shatter. As shown in FIG. 2, strike plate 90 extends upwardly from the bottom of upper housing portion 70 and extends at an angle away from swing hammers 85. Accordingly, striker plate 90 has portions spaced back substantially from the vertical tangent to the circular arc of rotation of the peripheral ends of hammers 85. By this arrangement, material struck by hammers 85 will move through a substantial distance and have a sufficeint velocity so as to shatter upon impact with striker plate 90.

In one embodiment, shown in FIG. 3, a plurality of spaced apart grade bars 92 may be supported in the lower housing portion 72 below the level of the axis of rotation of swing hammer head 80 and to extend across the interior of the housing in a circular arc spaced slightly beyond the circular arc of rotation of the peripheral ends of hammers 85 and centered on axis of rotation of swing hammer head 80. By this arrangement, grade bars 92 cooperate with hammers 85 to pulverize material to a desired particle size, with the pulverized material passing through the space between grade bars 92. These bars 92 are eliminated when bottles are being processed because it is important to have rapid flow through of the bottles, without build up of material. A filler plate is inserted to protect support members 93 when grade bars 92 are removed.

In accordance with the invention, grade bars 92 are located in a limited region of lower housing portion 72, namely, the region extending from the point where the rotating hammers 85 enter lower housing portion 72 in the direction of rotation thereof through a distance less than one half of the semi-circular arc through which the hammers 85 rotate in the lower housing portion. In a preferred construction, this limited region extends for about one third of the semi-circular arc. As is shown in FIG. 2, the remainder of the region of this semi-circular arc (ie., beyond the grade bars 92) is clear so that material that does not pass between grade bars 92 can pass through said clear region to the bottom of the housing.

Figure 3:
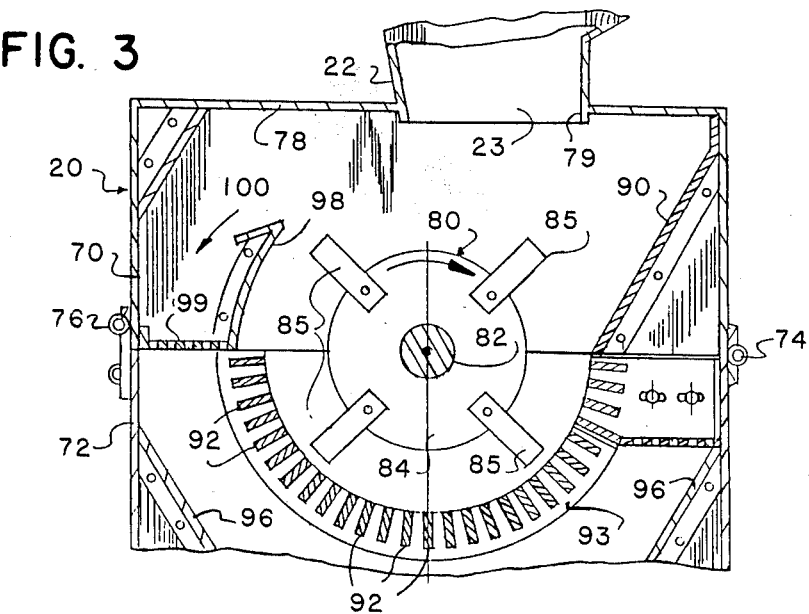
FIG. 3 is a sectional view similar to that of FIG. 2 with an adjustment made for an alternate mode of operation.
Figure 5:
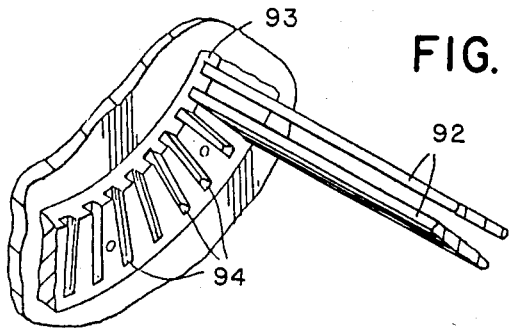
FIG. 5 is a fragmentary isometric view of a detail.

Grade bars 92 are set to extend radially outwardly from the axis of rotation of swing hammer head 80 as is shown in FIG. 3 and are supported at their ends by a pair of semi-circular annular support members 93 mounted on the side walls of lower housing portion 72. The ends of grade bars 92 are received in slot-like recesses 94 in support members 93 for positioning thereof in spaced apart relation, as shown in FIG. 5. The spaces between grade bars 92 determine the maximum size of the pulverized material that passes through the mill 20. The mesh size of the screen of separating means 27 is approximately the same as the size of the spaces between grade bars 92. The size of the grade bars can be adjusted to allow control of the size of the crushed glass and to extend grade bar wearability.

A pair of guide plates 96 are mounted in the lower housing portion 72 to provide guides for the movement of shattered and pulverized material delivered to the bottom opening 24. Guide plates 96 are located below the grade bar region and converge in a downward direction to guide the material through opening 24.

An arcuate plate 98 is mounted in upper housing portion 70 in the region thereof opposite striker plate 90 to provide an escape or exit for metal or other contaminents contained in the feed to mill 20. As shown in FIG. 2, plate 98 is spaced circumferentially outwardly from the path of travel of the peripheral ends of swing hammers 85 and cooperates with the side wall of upper housing 70 to define an exit chamber 100.

In the position shown in FIG. 2 hopper 22 has its discharge opening 23 located with a substantial portion behind vertical plane passing through the axis of rotation of swing hammer head 80 as is shown in FIG. 2. Accordingly, a substantial part of the material discharged through hopper 22 is contacted by the hammers 85 at a location behind this vertical plane.

Referring to FIG. 3 wherein the mill 20 is set up for the treatment of plate glass, there is a modification made to the set condition of the mill 20 as shown in FIG. 2. This modification is the addition of grade bars 92 completely throughout the semi-circular extent of members 93. These additional grade bars 92 add to the crushing capabilities of the pulverizing mill 20 as hammers 85 cooperate therewith throughout the entire semi-circular extent thereof.

In the use of mill 20 for the treatment of glass bottles of the like having metal parts thereon the mill is set up in the position shown in FIG. 2 and the bottles are delivered into hopper 22. The swing hammer head 80 is set to operate at an appropriate speed of rotation, such as for example, 1300 RPM. As the swing hammer head 80 rotates, hammers 85 take the radially extending position shown in FIG. 2 as a result of the centrifugal force and strike the falling glass bottles as hammers 85 rotate underneath opening 23. When struck, the glass bottles are propelled with a very high velocity toward striker plate 90 and impact the same with a force such that the glass is shattered and separated from the metal parts on the bottle. Some of the metal parts will bounce back from striker plate 90 into the metal exit 100. Also, most of the glass bottles will be shattered into a very small size except for the large heavy bottom portion of the bottle. The glass is then pulverized by the action of the swing hammers 85 and the pulverized glass passes to the lower portion of the mill and out through the bottom opening 24. Most of the metal parts will fall through the open region and pass through the discharge opening 24. However, these metal parts are oversize and will be separated by the various separating means as described with respect to FIG. 1.

The arrangement shown in FIG. 2 will also be suitable for the treatment of laminated glass of the type having plastic laminations between glass sheets. In this case the laminations are separated from the glass by the shattering action described above and fall through the open region adjacent the grade bars 92.

In the use of mill 20 for the treatment of plate glass the mill is set up in the position shown in FIG. 3 as described above. In this case the plate glass falls from the bottom opening 23 into contact with swing hammers 85 which perform a pulverizing action thereon, although there is some shattering of the glass. The glass particles are passed through the openings between grade bars 92 which are located throughout the entire semi-circular extent as shown in FIG. 3 and fall through the bottom of the mill.

As shown in FIG. 6, the drive mechanism for the mill 20 and conveyor 25, a vacuum drive can be operated from motor 21. Pulley 50 is attached to shaft 82 of the mill 20 and is driven by belt 52 coming from pulley 51 on motor 21. Pulley 53 is attached to belt 54 to additionally receive transmitting power from motor 21 via shaft 82 of mill 20. Inner pulley 55 drives belt 56 and pulley 57 which then transmits power to the second conveyor 25. Both pulley 55 and 57 are fully adjustable so that they can adjust the amount of slack in conveyor 25. Shims and adjustable mountings can be used to make on site adjustments.

As shown in FIG. 7, motor 26 drives pulley 60 which transmits power through belt 64 to pulley 63, thereby driving the third conveyor belt 29. A pulley 61 is driven by belt 62 to provide power to the shaker 27. The drive of pulley 63 is controlled by a slack adjustment clutch on belt 64, the detail of which is more clearly shown in FIG. 8.

As shown in FIG. 8, pulley 63 is driven by belt 64 which in turn is driven by pulley 60 from motor 26. The pulley 63 drives belt 62 and pulley 61 which causes shaker 27 to function as described above, so as to separate uniformly pulverized particles, causing the uniform particles to be deposited on conveyor 29 by passing through the screen. During the operation of the apparatus, the normal condition is for shaker 27 and belt 29 to be operating and therefore, the slack in belt 64 is taken up to permit transmission of power via belt 64. As shown in the top portion of FIG. 8, support 65, which is anchored to a frame, has attached to it at one end spring 66. At the other end of spring 66 is arm 67 which is attached to support 65 at a pivot point shown by the intersection of support 65 and arm 67, so that tension in spring 66 urges arm 67 to apply tension to belt 64 via pulley 68. In this normal operating condition, hook 69 is disengaged and the pressure of pulley 68 causes belt 64 to be tight, thereby allowing pulley 60 to transmit power to pulley 63.

When it is desirable to disengage the shaker 27 and belt 29, slack in belt 64 is provided by releasing pulley 68 from tension against belt 64. This tension is released by attaching hook 69 to a support 70 so as to bend arm 67 about the pivot point of its attachment to frame 65 and thus overcome the force of spring 66. This arrangement is shown in the bottom half of FIG. 8.

The slack adjustment clutch shown in FIG. 8 is shown as a preferred embodiment by which power from a motor such as motor 26 is transmitted through a drive pulley 60 to a working pulley 63 via a slack belt 64 by application of a clutch pulley 68 attached to support 65, spring 66 and arm 67. Hook 69 and bar 70 provide control over engagement and disengagement of the clutch wheel 68. This method of transferring power from a motor to an adjacent piece of equipment such as a shaker 27 or a belt 29 and the like is the preferred means of actuating the various pieces of equipment which comprise the system of this invention. Accordingly, the drive slack clutch assembly shown in FIG. 8 may be used to drive any of the pulleys shown in FIG. 1, as well as any of the other apparatus which depends upon a rotating shaft to transmit power. All of the conveyor belts can easily be controlled by one operator if a device similar to that shown in FIG. 8 is used to drive each of them separately.

As shown in FIG. 9, the operation of the magnetic means 17 with respect to the conveyor belt 15 is shown. The magnet 17 is positioned adjacent a rotating belt 47 which rotates in a direction perpendicular to the direction of rotation of the conveyor belt 15. Thus, as glass products are carried by the conveyor 15 up to the hopper 22 in the direction shown by arrow C, the rotation of belt 47 in the direction of arrow CP permits those metallic objects contained on belt 15 which are attracted to magnet 17 to strike the belt 47 and be carried along by the belt 47 while the metallic particles are in the magnetic field of magnet 17. When the metal parts are picked up on belt 47, they are carried past belt 15, as magnet 17 extends to the left of belt 15. At this time, the metallic parts fall off the belt 47 into a suitable collection container. Flights 48 are normally used in conjunction with belt 47 to further assist in the removal of metallic objects carried by the belt 47 out of the path of the belt 15.

While particular embodiments of the present invention have been illustrated and described herein, it is not intended to limit the invention and changes and modifications may be made therein within the scope of the following claims.

What is claimed is:

1. Apparatus for producing pulverized glass which is free from nonglass particles, consisting essentially of:
   feed means for providing a supply of glass objects which includes caps and other metallic objects therewith;
   first conveyor means positioned to receive said supply of said glass objects and transfer said objects to an impactor means;
   first magnetic means for removing metallic objects being moved on said first conveyor means;
   impactor means positioned adjacent said first conveyor means in operating relationship to receive said glass objects from said first conveyor means after said magnetic means and adapted to propel said objects against a striker plate to shatter said glass and free said caps and other metallic objects from said glass, said impactor means including separator means located within to separate shattered glass from said caps and other metallic objects;
   said impactor means comprising a pulverizing mill having a plurality of rotating hammers and a stricker plate positioned to directly intercept the pass of glass entering said impactor means, said plurality of rotating hammers rotating about an axis of rotation within said impactor means located in a predetermined horizontal plane,
   a hopper means having an opening positioned offset from a vertical plane passing through said axis of rotation to thereby position said glass objects in contacting relationship with at least one of said hammers, said striker plate being aligned to receive said glass objects after said objects have been contacted by said hammers, said separator means within said impactor means including an arcuate plate mounted within said impactor means to cooperate with a side wall of said impactor means to define an exit chamber for said caps and other metal objects, the opening to said exit chamber being located above said horizontal plane through the axis of rotation of said hammers, second conveyor means positioned to receive said shattered glass from said impactor means and transfer said glass to a sizing means; and sizing means having an inlet and an outlet and positioned to receive said shattered glass directly into said inlet from said second conveyor means separate those pieces of shattered glass which are within a predetermined size, and transfer said separated pieces through said outlet to a collection means.

2. The apparatus of claim 1, wherein said first magnetic means includes a rotating cross belt and a magnet, and is positioned in magnetically transferring relationship to said metallic objects to transfer said objects from said first conveyor means to said rotating cross belt.

3. The apparatus of claim 2, wherein said first magnetic means includes a rotating belt rotating in a direction perpendicular to the rotation of the first conveyor means and a magnet positioned adjacent said rotating belt to transfer metallic objects from the first conveyor belt to the rotating transverse belt for transfer to a suitable collector.

4. The apparatus of claim 1, which further includes a vacuum means in operating relationship with said second conveyor means to withdraw dust and lightweight products such as paper from said shattered glass as said second conveyor means carries said shattered glass.

5. The apparatus of claim 4, which further includes motor means for driving said impactor means and vacuum means and said second conveyor from a single power source.

6. The apparatus of claim 5, which further includes a third conveyor means and a second motor means for operating said sizing means and said third conveyor means from a single power source.

7. The apparatus of claim 1, which further includes third conveyor means positioned to receive and transfer said separated pieces of shattered glass to a collection means.

8. The apparatus of claim 7, which further includes second magnetic means positioned to remove metal objects being carried on said third conveyor means.

9. The apparatus of claim 1, which further includes adjustable grade bars to control the size of the shattered glass particles.

10. The apparatus of claim 1, wherein said first conveyor means and first magnetic means are located on a first portable vehicle capable of being positioned between said feed means and the impactor means.

11. The apparatus of claim 1, wherein said impact means, second conveyor means, and sizing means are mounted on a movable vehicle.

12. The device of claim 1, wherein said impactor means is adapted to adjustably receive glass bottles and plate glass.

13. The apparatus of claim 11, wherein said sizing means is driven by a motor driven belt and pulley arrangement, including a biasing means normally applying tension to said belt to transmit power via said belt and pulley, said biasing means further including means for overcoming said bias to remove tension of said belt.

* * * * *